United States Patent [19]

Burkhardt

[11] Patent Number: 4,570,346
[45] Date of Patent: Feb. 18, 1986

[54] LENGTH OR ANGLE MEASURING DEVICE

[75] Inventor: Horst Burkhardt, Truchtlaching, Fed. Rep. of Germany

[73] Assignee: Dr. Johannes Heidenhain GmbH, Traunreut, Fed. Rep. of Germany

[21] Appl. No.: 601,864

[22] Filed: Apr. 19, 1984

[30] Foreign Application Priority Data

Apr. 27, 1983 [DE] Fed. Rep. of Germany ....... 3315214

[51] Int. Cl.$^4$ ............................................. G01B 11/04
[52] U.S. Cl. .................................. 33/125 R; 33/126.6
[58] Field of Search .................. 33/125 R, 126.5, 126, 33/126.6

[56] References Cited

U.S. PATENT DOCUMENTS

| 2,700,222 | 1/1955 | Swenson | 33/126.5 |
|---|---|---|---|
| 2,779,045 | 1/1957 | Harvey | 33/126.5 |
| 2,854,752 | 10/1958 | Heacock | 33/126.6 |
| 2,952,155 | 9/1960 | Koehne | 33/126.6 |
| 3,435,918 | 4/1969 | Chombard . | |
| 4,170,826 | 10/1979 | Holstein . | |
| 4,170,829 | 10/1979 | Nelle . | |

FOREIGN PATENT DOCUMENTS

| 1046180 | 12/1958 | Fed. Rep. of Germany . | |
|---|---|---|---|
| 1176382 | 9/1959 | Fed. Rep. of Germany . | |
| 2016253 | 4/1970 | Fed. Rep. of Germany . | |
| 2349944 | 11/1974 | Fed. Rep. of Germany . | |
| 2712421 | 9/1978 | Fed. Rep. of Germany . | |
| 2735154 | 10/1978 | Fed. Rep. of Germany . | |
| 855475 | 11/1960 | United Kingdom | 277/126 |

OTHER PUBLICATIONS

Reibungsverminderung durch mechanische Schwingungen, by Von Wolfgang Weishaupt, from Technisches Messen atm 1976 Heft 11, pp. 345–348.

Primary Examiner—Robert I. Smith
Attorney, Agent, or Firm—Willian, Brinks, Olds, Hofer, Gilson & Lione Ltd.

[57] ABSTRACT

A length measuring instrument includes a flexible measuring band which slides in a groove defined by a scale carrier body. The measuring band is fixed at one end to the carrier body. The second, free end of the measuring band is fastened in an oscillator which excites this free end into high frequency, low amplitude vibrations. These vibrations act virtually to eliminate harmful friction between the measuring band and the scale carrier body, and to reduce fouling of the measuring band markedly.

11 Claims, 4 Drawing Figures

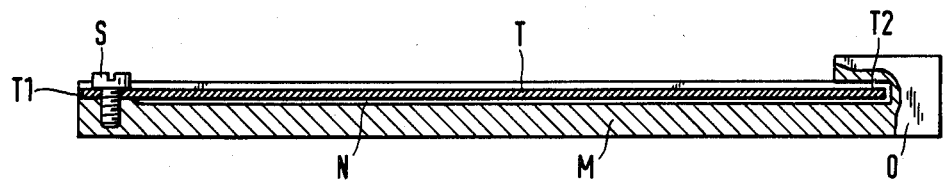
_Fig. 3_
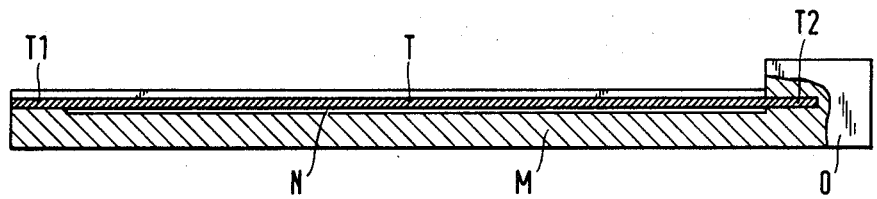
_Fig. 4_

1

LENGTH OR ANGLE MEASURING DEVICE

BACKGROUND OF THE INVENTION

The present invention relates to an improvement for a length or angle measuring system of the type which comprises a scale carrier body and a measuring scale, wherein the scale is connected to the carrier body so as to be slightly shiftable with respect thereto.

German Pat. No. 27 12 421 discloses a prior art length measuring device in which a measuring band which operates as a scale is mounted in a groove-type recess in a scale carrier body such that the measuring band is slidable in the recess and the measuring band is fixed to the carrier body at one end.

Such measuring systems raise certain design problems. On the one hand, the tolerance between the dimensions of the groove and the dimensions of the measuring band should be small in order to preserve the required degree of measuring accuracy. On the other hand, measurement tolerances should be established as generously as possible in order to minimize manufacturing costs. However, since close dimensional tolerance takes precedence, because of the higher measuring accuracy obtainable when close tolerances are used, friction problems typically occur when the measuring band is slid into the groove of the scale carrier body. Furthermore, friction problems can occur in operation at a later time, when by reason of temperature fluctuations the scale and the scale carrier body expand differently, causing relative movement therebetween. In order to preserve high measuring accuracy it is important to minimize friction between the measuring band and the scale carrier body that can, under some circumstances, result in measurement errors. For example, in the event of relative movement between the measuring band and the carrier body, frictionally caused measuring errors can result solely through the weight of the measuring band itself.

SUMMARY OF THE INVENTION

The present invention is directed to an improvement to measuring systems of the type described above, which avoids the disadvantages of certain prior art measuring systems by providing a measuring system in which harmful frictional effects are substantially eliminated, despite close dimensional tolerances between the scale and the carrier body.

According to this invention, a measuring system of the type described initially above is provided with at least one vibration generator which is connected to at least one of the scale and the carrier body such that the vibration generator vibrates said at least one of the scale and the carrier body to substantially reduce friction between the scale and the carrier body.

The present invention provides the important advantage that, by vibrating at least one of the scale and the carrier body, close measurement tolerances can be provided without impeding longitudinal shiftability of the scale with respect to the carrier body. Troublesome frictional forces between the scale and the carrier body which could result in tensions on the scale and concomitant measurement errors are substantially excluded. Further advantageous features of the invention are set forth in the dependent claims.

The invention itself, together with further objects and attendant advantages, will best be understood by reference to the following detailed description, taken in conjunction with the accompanying drawings.

BRIEF DESCRIPTION OF THE DRAWINGS

FIG. 3 is a view corresponding to FIG. 1 of a second preferred embodiment of this invention.

FIG. 4 is a view corresponding to FIG. 1 of a third preferred embodiment of this invention.

DETAILED DESCRIPTION OF THE PRESENTLY PREFERRED EMBODIMENTS

Figure 1:
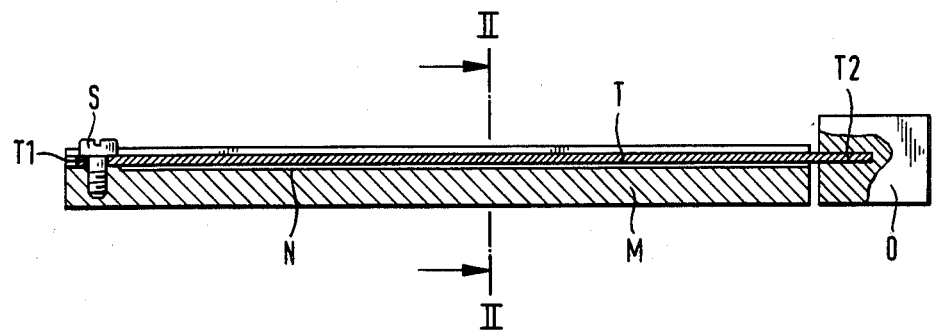
FIG. 1 is a schematic representation of portions of a length measuring system which incorporates a presently preferred embodiment of this invention.

Turning now to the drawings, FIG. 1 is a schematic representation of a measuring system which includes a scale carrier body M that defines a groove N running in a longitudinal direction. A measuring scale T in the form of a flexible band that carries a measuring graduation on its upper side is slideably mounted in the groove N. The scale T defines a first end T1 which is fixed in place to the carrier body M by means of a screw S. Of course, it will be apparent to those skilled in the art that the fixing of the end T1 of the scale T can alternately be accomplished by means of a suitable pin, cement, or the like. Furthermore, it is possible to fix the scale T in place at another point along the carrier body, such as a point near the middle of the carrier body M.

In this preferred embodiment, the free end T2 of the measuring band T is secured to a vibration generator O. The vibration generator O sets the free end T2 in a high frequency vibration with small amplitude. The groove N is dimensionally matched to the measuring band T, and the friction between the groove N and the measuring band T is reduced to a considerable extent by reason of the vibrations excited in the measuring band T by the vibration generator O. The amplitude of these vibrations is so slight that the scanning of the measuring band T by the scanning unit (not shown) is not adversely affected.

The vibrations excited in the measuring band T reduce the friction between the measuring band T and the groove N (caused for example by temperature fluctuations which cause the measuring band T to shift relative to the scale carrier body M). The measuring accuracy and the repetition accuracy (precision) of the measurement are thereby very substantially improved. By way of example, in this preferred embodiment the preferred frequency of oscillation is in the range of 100–2,000 Hz, and the preferred amplitude of oscillation is in the range of 1–10 micron. The presently preferred direction of oscillation is parallel to the measuring direction, but in alternate embodiments the direction of oscillation can be oriented otherwise, such as in a plane perpendicular to the measuring direction.

Depending upon the particular use, the vibration generator O can be constructed with a magnetostrictive, piezoelectric, magnetic, acoustical or other similarly operating oscillator.

In addition, it lies within the scope of this invention to excite the scale carrier body M into vibration by means of the oscillator O. This embodiment of the invention is particularly advantageous in assembling the scale with the carrier body. In this embodiment, the scale carrier body M is anchored in a mounting device (FIG. 3) in which there is arranged the oscillator O. Despite close manufacturing tolerances, the measuring band T can easily be slid into the groove N, since the scale carrier body M vibrates at a high frequency, but with very small amplitude. Friction is virtually eliminated in the sliding of the measuring band T into the groove N of the scale carrier body M, so that assembly is simplified and assembly time is shortened.

Figure 2:
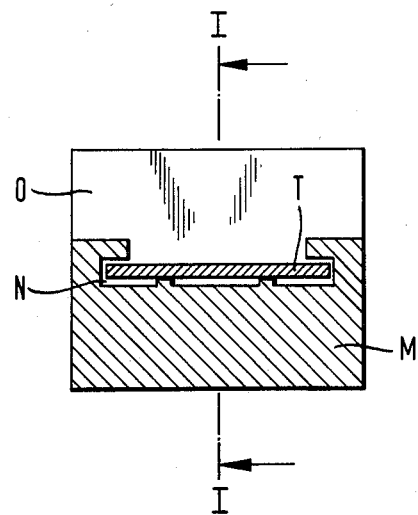
FIG. 2 is a cross-sectional view taken along line 2—2 of FIG. 1, at an enlarged scale.

In addition, the present invention can readily be adapted for use with bending resistant, rigid scales in place of the flexible measuring band T shown in FIGS. 1-3 (see FIG. 4). It must merely be ensured that the scanning of the scale is not impaired by the vibrations.

A further advantage of this invention is that the scale T vibrated as described above has a remarkable tendency not to accumulate dirt. This is particularly important when the invention is applied for use with photoelectric scanning instruments.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. In a length or angle measuring system of the type comprising a scale carrier body and a measuring scale connected to the carrier body so as to be slightly shiftable with respect thereto, said system capable of detecting measuring scale distortion caused by differential temperature fluctuations, the improvement comprising:
at least one vibration generator which is connected to vibrate at least one of the scale and the carrier body to reduce distortional forces applied to the scale from differential thermal expansion of the scale and carrier body.

2. The invention of claim 1 wherein the carrier body comprises a hollow profile which defines a groove therein extending along a longitudinal direction; wherein the scale comprises a band configured to fit in and slide along the groove; wherein the band is fixed to the profile at one end of the band; and wherein the vibration generator is fixed to the scale at the other end of the band.

3. The invention of claim 2 wherein the vibration generator generates high frequency, low amplitude vibrations of the band to substantially reduce friction between the band and the carrier body.

4. The invention of claim 1 wherein the vibration generator comprises a magnetostrictive oscillator.

5. The invention of claim 1 wherein the vibration generator comprises a piezoelectric oscillator.

6. The invention of claim 1 wherein the vibration generator comprises a magnetic oscillator.

7. The invention of claim 1 wherein the vibration generator comprises an acoustical oscillator.

8. The invention of claim 1 wherein the vibration generator generates vibrations having a frequency in the range of 100-2,000 Hz.

9. The invention of claim 1 wherein the vibration generator generates vibrations having an amplitude in the range of 1-10 microns.

10. The invention of claim 1 wherein the carrier body is substantially coextensive with the measuring scale.

11. In a length or angle measuring system of the type comprising a scale carrier body and a measuring scale substantially coextensive with and immovably connected at one point to the carrier body so as to be slightly shiftable with respect to the carrier body at points spaced from the one point, said measuring system capable of detecting measuring scale distortion caused by differential temperature fluctuations, the improvement comprising:
at least one vibration generator which is connected to vibrate at least one of the scale and the carrier body to reduce distortional forces applied to the scale from differential thermal expansion of the scale and carrier body.

* * * * *